Oct. 22, 1963     J. A. DONELAN     3,108,177
WELDING ELECTRODE ARRANGEMENTS
Filed May 29, 1961     2 Sheets-Sheet 1

Oct. 22, 1963     J. A. DONELAN     3,108,177
WELDING ELECTRODE ARRANGEMENTS

Filed May 29, 1961     2 Sheets-Sheet 2

INVENTOR
JAMES ARTHUR DONELAN
BY
ATTORNEYS

United States Patent Office 3,108,177
Patented Oct. 22, 1963

3,108,177
WELDING ELECTRODE ARRANGEMENTS
James Arthur Donelan, West Harrow, England, assignor to The General Electric Company Limited, London, England
Filed May 29, 1961, Ser. No. 113,485
Claims priority, application Great Britain May 30, 1960
5 Claims. (Cl. 219—81)

This invention relates to welding electrode arrangements for tubes, rings, caps and like annular workpieces which require to be supported internally whilst a welding operation is carried out on them.

One known arrangement for this purpose comprises a mandrel carrying or forming a first electrode arranged to extend within the workpiece, and a second electrode in the form of an idler roller mounted externally of the workpiece and arranged to co-operate with the first electrode, the electrodes being rotatable one relatively to the other so that during a welding operation different circumferential parts of the workpiece pass between co-operating portions of the electrodes and a continuous or substantially continuous circumferential welding seam is formed. On workpieces of small diameter, however, satisfactory welds may be very difficult to obtain with this arrangement owing to the area of contact between the second electrode and the workpiece being too small, and one object of the present invention is to provide an improved electrode arrangement whereby this difficulty is overcome.

According to the present invention, in a welding electrode arrangement for tubes, rings, caps and like annular workpieces, and comprising a mandrel carrying or forming a first electrode arranged to extend within the workpiece, and a second electrode mounted externally of the workpiece and arranged to co-operate with the first electrode, the electrodes being rotatable one relatively to the other so that during a welding operation different circumferential parts of the workpiece pass between co-operating portions of the electrodes, and a continuous or substantially continuous welding seam is formed, the second electrode is an annular member arranged to encircle the workpiece and has an internal work engaging face arranged to co-operate with the first electrode, this second electrode being rotatably mounted.

Preferably, the second electrode is rotatably mounted in bearings within a welding head and the first electrode is driven by rotation of the mandrel, the second electrode being an idler arranged to be driven by frictional engagement with the workpiece. The welding head may be adjustable with respect to the axis of the mandrel.

In one preferred embodiment of the invention, the second electrode is constituted by a replaceable annular insert mounted on a conducting bush, itself supported on ball bearings or roller bearings within the welding head, and the electrode being partially electrically insulated from the bearings. Thus, the arc of contact between the electrode and the work surface can be varied by using inserts of different internal diameters, so permitting control of the temperature gradient across the section of the workpiece and facilitating the positioning of the highest temperature at the interface of the workpiece components.

One construction of electric resistance welding machine incorporating an electrode arrangement according to the invention will now be described, by way of example, with reference to the accompanying drawings, of which:

Figure 1:
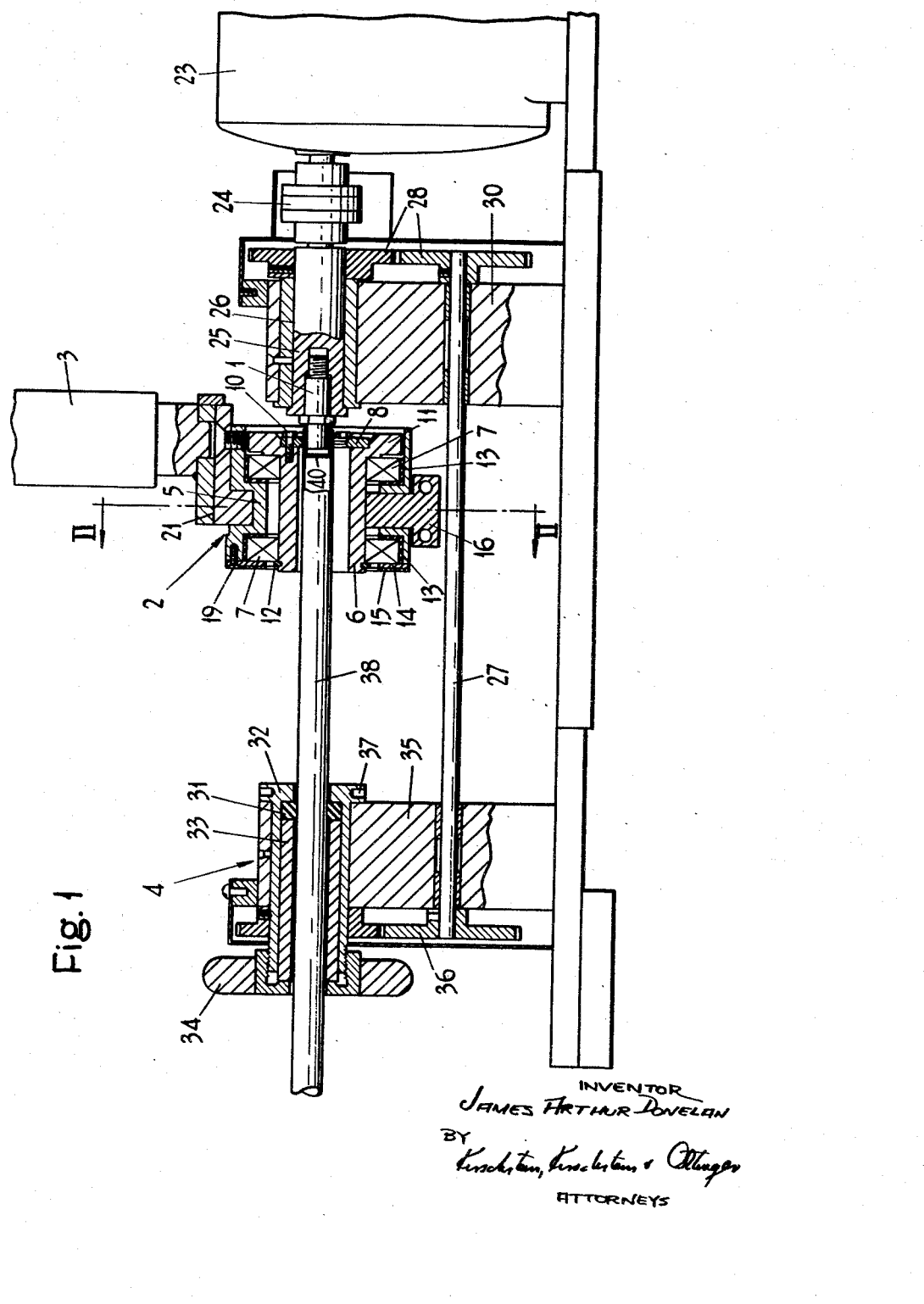
FIGURE 1 is a sectional elevation of the welding machine shown set up for welding an internal end cap into a tubular workpiece.
Figure 2:
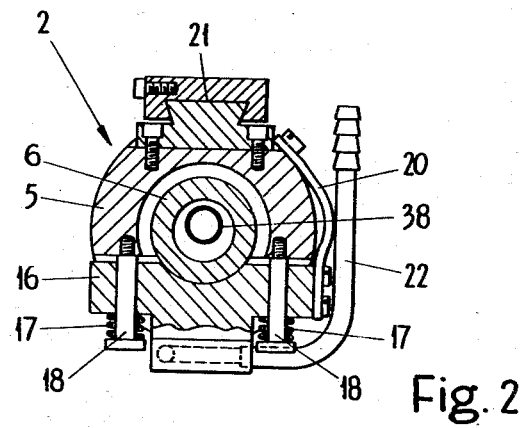
FIGURE 2 is a cross sectional view of the assembled welding head of the machine, the section being on the line II—II in the FIGURE 1.

Referring now to FIGURE 1, the welding machine comprises a driven, work-supporting mandrel 1, constituting the first electrode; the welding head, denoted generally 2 and shown further in FIGURE 2; a column 3, both supporting and loading the welding head 2; and a tube-supporting and driving mechanism, denoted generally, 4. The welding head 2 is mounted on the welding machine by means of the column 3 which may be hydraulically or pneumatically operated and is movable vertically to impose a controlled load on the electrode/workpiece interfaces by way of the welding head 2.

Referring now to FIGURE 2 also, the welding head 2 comprises a body member 5, in which an electrode-supporting bush 6 is rotatably mounted in ball bearings 7, and the second electrode itself, in the form of the annular insert 8. This electrode 8 is of smaller internal diameter than the supporting bush 6 and its internal edges are bevelled to reduce the axial extent of the welding current path. It is fitted concentrically into a recess in one end of the bush 6 to which it is fixed by hexagon headed screws 10. The bush 6 is a push fit into the ball bearings 7 and its axial position is limited by the flange 11 at one end and by the circlip 12 at the other end, each bearing against the neighbouring bearing 7. Each bearing 7 is mounted in the body member 5 by means of an insulating lining member 13 in the form of a cup-shaped annulus which precludes current paths through the bearing while leaving it in electrical contact with the electrode 8. An insulating and protective bearing cover is provided for the bearing not covered by the bush flange 11, in the form of an annular insulating plate 14 and an annular brass plate 15 secured by screws 19 to the body member 5.

Welding current is fed to the body 5 through the column 3. Contact is made between the body 5 and the rotating bush 6 by a spring loaded sliding contact 16 in the form of an inverted saddle movable in a transverse slot in the body 5. The contact 16 is urged into contact with the bush 6 by springs 17 around location pins 18 screwed into the body 5. The contact 16 is further connected to the body 5 of the welding head 2 by a flexible connection 20 attached to the two parts.

Water supply tubes 22 are brazed into an extension of the sliding contact 16 to provide cooling means for the contact and for the electrode 8.

The welding head 2 is adjustable longitudinally with the tubular workpiece by means of a dovetail joint 21 connecting the end of the column 3 to the body 5 of the welding head 2.

The mandrel 1 is fitted, by screwing, into a rotatable member 25 mounted in a bearing 26, the member 25 being driven by a motor 23 through flexible coupling 24, and itself driving a shaft 27 through gearing 28. The mandrel bearing 26 and gearing 28 are both supported from the machine bed by a support member 30.

The mandrel 1 may be reduced in diameter over most of its length leaving an annular ridge corresponding to the shape and position of the electrode 8, so reducing the axial extent of the welding current path.

The tube-supporting and driving mechanism 4, comprises a compressible rubber annulus 31 trapped in a rotatably mounted cylinder 32 by a piston member 33 which is forced into the cylinder 32 by a hand operated nut member 34. The cylinder 32 is rotatable in a support member 35 fixed to the machine bed. The member 35 also supports the shaft 27 which drives the cylinder 32-piston 33-hand nut 34-rubber annulus 31 combination through gearing. Holes 37 are provided in the cylinder 32 for use as key ways against which torque on the hand nut 34 can be exerted.

The mandrel 1 and electrode 8 are required to contact the tubular workpieces over a small arc of contact only and consequently the inner and outer diameters of the workpieces are of a size intermediate between the diameter of the mandrel 1 and the internal diameter of the electrode 8. The centre lines of the electrode 8, workpieces and mandrel 1 are, therefore, parallel and mutually displaced in a vertical plane.

The difference of workpiece and electrode diameters also necessitates, ideally, the provision of gear-ratios such that the linear velocity of the end cap 40 is equal to that of the mandrel 1 at their point of contact.

In operation, the tubular workpiece or tube 38 in which the end cap 40 is required to be welded, is fitted through the tube supporting mechanism 4 with the end cap 40 in position, through the welding head 2 and onto the mandrel 1. The hand nut 34 is then tightened, clamping the tube 38 resiliently in the rubber annulus 3. The welding head 2 is lowered into position, suitable pressure being applied between it and the mandrel 1, the motor is energised and welding is commenced. The passage of the welding current may be controlled by timing mechanism to ensure its passage over, say, only one revolution of the tube. The resilient driving support 4 allows for minor inaccuracies in lining up and any slight inaccuracies in the tube 38 itself while also preventing any damage due to metallic gripping of the tube 38.

The machine is adapted for use with workpieces of various diameters, and with workpieces of different materials requiring different arcs of contact with the second electrode. For this purpose, the annular insert 8 constituting the second electrode is replaceably mounted and can easily be replaced by another insert having an internal work engaging face of different diameter.

Figure 3:
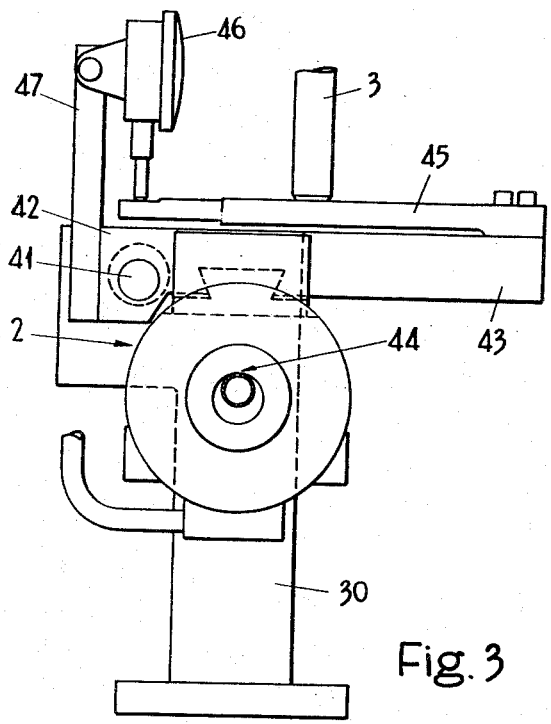
FIGURE 3 is a partly diagrammatic end view of a modified form of welding head mounting.

Referring now to FIGURE 3, in the modified construction of welding head mounting, a spindle 41 is mounted eccentrically from the end of a larger spindle which is rotatable in an extension of the support member 30. On the spindle 41 an arm 42 is pivoted, this arm 42 taking the place of the lower end of the column 3 in the previous construction. The arm 42 has mounted on it, by means of a dovetail joint similar to that at 21 in FIGURE 1, the welding head 2, the arm 42 lying across the axis of the welding head 2 and having an extension 43 on the far side of the welding head from the spindle 41. The eccentricity of the spindle 41 allows fine transverse adjustment of the point or arc of contact 44 of the electrode 8 and the workpiece. The spindle 41 is adapted to be locked in position on the extension of the support member 30.

Rigidly fixed to the end of the extension 43 of the arm 42 is a cantilever arm 45 which extends back along the length of the arm 42 but not in contact with it. In this construction, the loaded column 3 is used for providing contact pressure only, and bears on the arm 42 indirectly, through the rigidity of the arm 45. A deflection indicator 46 mounted on an arm 47, fixed to the back of the arm 42 records the deflection of the end of the cantilever 45 with respect to the arm 42 and hence gives a measure of the loading imposed by the column 3.

The advantages of this modified construction lie in the transverse adjustability of the welding head 2, the more positive location of the welding head 2, with respect to the mandrel 1 and the direct measurement of the contact pressure.

I claim:

1. Apparatus for welding tubes, cylinders and like annular workpieces, comprising a mandrel supporting a first electrode arranged to extend within the workpiece, a second electrode of annular form arranged to encircle the workpiece and cooperate with said first electrode, said second electrode being rotatable with respect to said first electrode and the dimensions of said first and second electrodes being such that, in a welding operation, a limited circumferential section of said workpiece is engaged by the work engaging faces of said electrodes, and a workpiece support consisting of a rotatably supported resilient annular member spaced axially of the workpiece from the work engaging faces of the electrodes and arranged to encircle, rotate with and be axially compressed upon the workpiece to permit the said workpiece support to accommodate any slight non-uniformity of the workpiece.

2. Apparatus for welding tubes, cylinders and like annular workpieces, comprising a mandrel, a first electrode arranged to extend within the workpiece and supported and rotatably driven by rotation of said mandrel, a second electrode of annular form arranged to encircle the workpiece and be driven by frictional engagement with the said workpiece, the dimensions of said first and second electrodes being such that, in a welding operation, a limited circumferential section of said workpiece is engaged by the work engaging faces of said electrodes, and a workpiece support consisting of a rotatably supported resilient annular member spaced axially of the workpiece from the work engaging faces of the electrodes and arranged to encircle, rotate with and be axially compressed upon the workpiece to permit the said workpiece support to accommodate slight non-uniformity of the workpiece.

3. Apparatus for welding tubes, cylinders and like annular workpieces, comprising a mandrel, a first electrode arranged to extend within the workpiece and supported and rotatably driven by rotation of said mandrel. A second electrode of annular form pivotally mounted externally of the workpiece arranged to encircle the workpiece and be driven by frictional engagement with said workpiece, means for mechanically loading said second electrode independently of said pivotal mounting, the dimensions of said first and second electrodes being such that, in a welding operation, a limited circumferential section of said workpiece is engaged by the work engaging faces of said electrodes, and a workpiece support consisting of a rotatably supported resilient annular member spaced axially of the workpiece from the work engaging faces of the electrodes and arranged to encircle, rotate with and be axially compressed upon the workpiece to permit the said workpiece support to accommodate slight non-uniformity of the workpiece.

4. Apparatus for welding tubes, cylinders and like annular workpieces, comprising a mandrel, a first electrode arranged to extend within the workpiece and supported and rotatably driven by said mandrel, a second electrode of annular form arranged to encircle the workpiece and cooperate with said first electrode, said second electrode being rotatably mounted in a welding head, a transverse arm, said welding head being mounted on said arm, a composite spindle having two eccentric ends, said arm being pivotally mounted on one end of said spindle and the other end being rotatably mounted in supporting means for said mandrel, the dimensions of said first and second electrodes being such that, in a welding operation, a limited circumferential section of said workpiece is engaged by the work engaging faces of said electrodes.

5. Apparatus for welding tubes, cylinders and like annular workpieces, comprising a mandrel, a first electrode arranged to extend within the workpiece and supported and rotatably driven by said mandrel, a second electrode of annular form arranged to encircle the workpiece and cooperate with said first electrode, said second electrode being rotatably mounted in a welding head, the dimensions of said first and second electrodes being such that, in a welding operation, a limited circumferential section of said workpiece is engaged by the work engaging faces of said electrodes, a transverse arm comprising two constituent arms fixed together and touching at one end only, said welding head being mounted on one said constituent arm, a composite spindle having two eccentric ends, said one constituent arm being pivotally mounted on one end of said spindle and the other end of said spindle being rotatably mounted in supporting means for said mandrel, the other of said constituent arms being arranged to be mechanically loaded and the relative deflection of said constituent arms providing a measure of the electrode/workpiece interface contact pressures.

References Cited in the file of this patent

UNITED STATES PATENTS

| | | |
|---|---|---|
| 1,681,604 | Winter | Aug. 21, 1928 |
| 2,323,903 | Fentress | July 13, 1943 |
| 2,788,430 | Oakley | Apr. 9, 1957 |
| 3,068,343 | Rossner | Dec. 11, 1962 |

FOREIGN PATENTS

| | | |
|---|---|---|
| 37,614 | Denmark | June 20, 1927 |